United States Patent
Hui et al.

(10) Patent No.: US 10,362,530 B2
(45) Date of Patent: Jul. 23, 2019

(54) METHOD AND APPARATUS FOR CONTROLLING NETWORK ACCESS IN DIRECTIONAL COMMUNICATION NETWORKS

(71) Applicant: ELECTRONICS AND TELECOMMUNICATIONS RESEARCH INSTITUTE, Daejeon (KR)

(72) Inventors: Bing Hui, Daejeon (KR); Junhyeong Kim, Daejeon (KR); Yeong Jin Kim, Daejeon (KR); Il Gyu Kim, Chungcheongbuk-do (KR); Hee Sang Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 84 days.

(21) Appl. No.: 15/593,501

(22) Filed: May 12, 2017

(65) Prior Publication Data
US 2017/0332418 A1    Nov. 16, 2017

(30) Foreign Application Priority Data

May 16, 2016    (KR) .......................... 10-2016-0059787
Apr. 24, 2017   (KR) .......................... 10-2017-0052484

(51) Int. Cl.
*H04W 36/00*    (2009.01)
*H04W 48/18*    (2009.01)
(Continued)

(52) U.S. Cl.
CPC ........... *H04W 48/18* (2013.01); *H04W 36/00* (2013.01); *H04W 36/16* (2013.01); *H04W 76/10* (2018.02);
(Continued)

(58) Field of Classification Search
CPC ... H04W 84/005; H04W 88/08; H04W 16/28; H04W 24/10; H04W 36/0005; H04W 36/0011; H04W 36/08; H04W 36/32
See application file for complete search history.

(56) References Cited

U.S. PATENT DOCUMENTS

2012/0219084 A1*  8/2012  Ihm .................... H04B 7/0617
                                                          375/267
2013/0322330 A1   12/2013  Kim et al.
(Continued)

FOREIGN PATENT DOCUMENTS

KR    10-1349167 B1    1/2014
KR    10-1507888 B1    4/2015

OTHER PUBLICATIONS

"Unidirectional RRH Arrangement for HST SFN", 3GPP TSG RAN WG4 Meeting #76bis, R4-155743, Oct. 2015.
(Continued)

*Primary Examiner* — Sai Aung
(74) *Attorney, Agent, or Firm* — LRK Patent Law Firm

(57) ABSTRACT

A radio unit (RU) in a directional communication network establishes a connection with a first antenna among two antennas of a first TE in a first moving object that first enters a serving duration of the RU according to a network access request from the first antenna, and when receiving the network access request from a second antenna among two antennas of a second TE in a second moving object that next enters the serving duration, the RU processes the network access request from the second antenna based on network access priority of the second antenna and network access priority of the first antenna to which the connection is established.

15 Claims, 6 Drawing Sheets

(51) Int. Cl.
*H04W 76/30* (2018.01)
*H04W 76/10* (2018.01)
*H04W 36/16* (2009.01)
*H04W 88/08* (2009.01)
*H04W 84/00* (2009.01)

(52) U.S. Cl.
CPC .......... *H04W 76/30* (2018.02); *H04W 84/005* (2013.01); *H04W 88/085* (2013.01)

(56) References Cited

U.S. PATENT DOCUMENTS

| | | | |
|---|---|---|---|
| 2014/0003327 A1* | 1/2014 | Seo | H04W 36/08 370/315 |
| 2014/0162652 A1 | 6/2014 | Kang et al. | |
| 2016/0219475 A1* | 7/2016 | Kim | H04L 5/00 |
| 2018/0102830 A1* | 4/2018 | Lange | H04B 7/15535 |

OTHER PUBLICATIONS

Yuzhe Zhou et al., "Joint Access Control Based on Access Ratio and Resource Utilization for High-Speed Railway Communications", Frequenz, Journal of RF-Engineering and Telecommunications, Mar. 2015.

* cited by examiner

METHOD AND APPARATUS FOR CONTROLLING NETWORK ACCESS IN DIRECTIONAL COMMUNICATION NETWORKS

CROSS-REFERENCE TO RELATED APPLICATIONS

This application claims priority to and the benefit of Korean Patent Application Nos. 10-2016-0059787 and 10-2017-0052484, filed in the Korean Intellectual Property Office on May 16, 2016 and Apr. 24, 2017, respectively, the entire contents of which are incorporated herein by reference.

BACKGROUND OF THE INVENTION

1. Field of the Invention

The present invention relates to a method for controlling network access in a directional communication network, and an apparatus using the same. More specifically, the present invention relates to a method for controlling network access in a case when two moving objects move through the same service duration between radio units (RUs) in a directional communication network.

2. Description of Related Art

A directional communication network for railway communication is provided with radio units (RUs) such as a remote radio head (RRH) along tracks, and terminal equipment (TE) in a means for transportation connects communication between a digital unit in a base station and a user terminal in the means for transportation through the RU. Such a directional communication network has the following merits compared to a non-directional communication network. In the directional communication network, a beam directs precisely in a railway direction, interference with another system that uses the same frequency bandwidth can be reduced, much wider coverage can be allowed with a power limitation, and much higher system throughput can be supported by freely using an unregistered frequency bandwidth such as a millimeter wave (mm wave).

In such a directional communication network, the terminal equipment (TE) in the moving object has relatively high mobility and thus a radio unit (RU) of the terminal equipment (TE) in the moving object is frequently changed, thereby causing frequent occurrence of handover. In this case, a network random access success rate and a network random access delay become core indicators for evaluating system performance. In most cases, moving objects are rarely distributed on railways, so TEs installed in the moving objects can use the entire system resources. However, when two moving objects cross each other, radio resource management (RRM) and scheduling may be needed because radio resources such as a frequency and time are allocated to two TEs. In this case, the network random access delay may be increased in order to process the RRM and the scheduling.

SUMMARY OF THE INVENTION

The present invention has been made in an effort to provide a network access control method that can reduce a network random access delay of TEs in two moving objects according to RRM and scheduling when the two moving objects move in the same serving duration between two RUs, and a method using the same.

According to an exemplary embodiment of the present invention, a network access control method for a radio unit (RU) that controls network access or terminal equipment (TE) in a obving object is provided. The method includes: establishing a connection with a first antenna among two antennas of a first TE in a first moving object that first enters a serving duration of the RU according to a network access request from the first antenna; receiving a network access request from a second antenna among two antennas of a second TE in a second moving object that next enters the serving duration; and processing the network access request from the second antenna based on network access priority of the second antenna and network access priority of the first antenna to which the connection is established.

The processing of the network access request may include: releasing the connection with the first antenna when the network access priority of the second antenna is higher than that of the first antenna; and establishing a new connection with the second antenna.

The processing of the network access request may further include, when receiving a network re-access request from the first antenna of which the connection is released, refusing the network re-access request until the first TE or the second TE exits the serving duration.

The processing of the network access request may include, when the network access priority of the second antenna is lower than that of the first antenna, maintaining the connection with the first antenna and refusing the network access request from the second antenna.

The refusing of the network access request may include refusing the network access request until the first TE or the second TE exits the serving duration.

The network access request may include identification information of the corresponding TE and an antenna flag that indicates whether an antenna that has sent the network access request is a head antenna that is disposed in front or a tail antenna that is disposed behind with reference to a moving direction of the moving object.

Network access priority of the head antenna may be set to be higher than network access priority of the tail antenna.

When network access priority of a head antenna of the second TE is set to be higher than that of a head antenna of the first TE, network access priority of a tail antenna of the second TE is set to be lower than network access priority of a tail antenna of the first TE.

The network access control method may further include: receiving a network access request from a third antenna among two antennas in a third TE in a third moving object that enters the serving duration after the second moving object; establishing a connection with the third antenna; and communicating with the third TE using a radio resource that is different from a radio resource allocated for the first TE or the second TE.

The radio resource may include at least one of time, a frequency, and a code.

The establishing the connection with the third antenna may include: while a connection with the first antenna or the second antenna is established, recognizing existence of the third TE that is different from the first TE and the second TE in the serving duration from a network access request received from the third antenna; and allocating a new radio resource that is different from radio resources allocated to the first TE and the second TE to the third TE.

According to another exemplary embodiment of the present invention, a network access control apparatus of an RU in a direction communication network is provided. The network access control apparatus includes: a transceiver that communicates with each terminal equipment (TE) in at least one moving object that enters a serving duration of the RU; and a processor that establishes a connection with an antenna of one TE according to network access priority of antennas of each TE.

When receiving a network access request from an antenna of a second TE having higher network access priority than an antenna of a first TE that has currently established a connection, the processor may release the connection with the antenna of the first TE and establish a new connection with the antenna of the second TE.

When receiving a network access request from an antenna of the second TE having lower network access priority than the antenna of the first TE that has currently established a connection, the processor may maintain the connection with the antenna of the first TE and reject the network access request from the antenna of the second TE.

The network access request may include identification information of the corresponding TE and an antenna flag that indicates whether the antenna that has sent the network access request is a head antenna that is disposed in front or a tail antenna that is disposed behind with reference to a moving direction of the moving object.

Network access priority of a head antenna may be set to be higher than network access priority of a tail antenna.

When network access priority of a head antenna of the second TE is set to be higher than that of a head antenna of the first TE, network access priority of a tail antenna of the second TE may be set to be lower than that of a tail antennal of the first TE.

When a third moving object enters the serving duration after the second moving object, the processor may establish a connection with an antenna of a third TE in the third moving object and use a radio resource that is different from a radio resource used for the second TE.

The radio resource comprises at least one of time, a frequency, and a code.

DETAILED DESCRIPTION OF THE EMBODIMENTS

Figure 1:
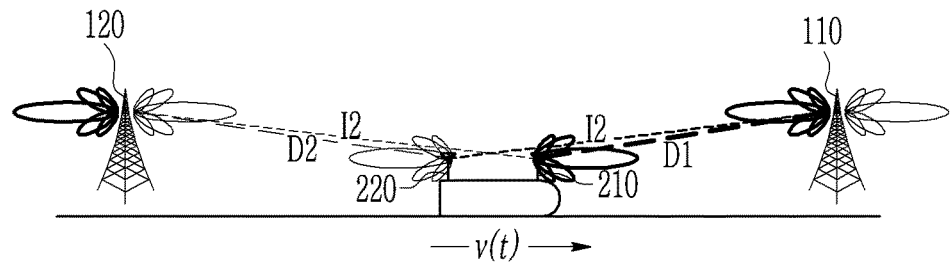
FIG. 1 shows an example of a directional communication network according to an exemplary embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

Hereinafter, a method for controlling network access in a directional communication network according to an exemplary embodiment of the present invention, and an apparatus using the same, will be described in detail with reference to the accompanying drawings.

FIG. 1 shows an example of a directional communication network according to an exemplary embodiment of the present invention.

Referring to FIG. 1, a user terminal (not shown) in a directional communication network is connected to a moving object, for example, terminal equipment (TE), by using a wireless signal such as Wi-Fi, and the TE communicates with a digital unit (DU) (not shown) through at least one of radio units (RUs) 110 and 120.

The RUs 110 and 120 are portions that process a wireless signal of a base station, and generally transmit and receive a radio frequency signal between the DU and an antenna. The RUs 110 and 120 may be connected with the DU through an optical cable. The DU is a portion that processes a digital signal of the base station, and is connected with an internet network through a gateway.

The RUs 110 and 120 have unique cell areas, and form a communication link with the TE in the cell area. The RUs 110 and 120 are provided along a railway, and each may have two directional antennas. The two directional antennas may be provided to face opposite directions. It is assumed that a train travels to the right from the left with speed of v(t). A directional beam may be generated by the directional antenna. The directional beam is used by the RUs 110 and 120 and the TE.

As shown in FIG. 1, when it is assumed that two directional antennas 210 and 220 are provided in the train, the two directional antennas 210 and 220 may respectively form directional beams. In this case, the directional antenna 210 disposed in a front side of the train is called a head antenna 210, and the directional antenna 220 disposed in a back side of the train is called a tail antenna 220. The head antenna 210 forms a desired communication link D1 with the RU 110 in front through the directional beam, and the tail antennal 220 forms a desired communication link D2 with the rearward RU 120 through the directional beam. The head antenna 210 and the tail antenna 220 simultaneously communicate with the frontward RU 110 and the rearward RU 120 through different links, respectively. In this case, by using the directional beams, cross-link interference, that is, an interference link I1 formed from the frontward RU 110 to the tail antenna 220 and an interference link I2 formed from the rearward RU 120 to the head antenna 210, can be avoided.

As described, when only one train exists between the frontward RU 110 and the rearward RU 120, the head antenna 210 and the tail antenna 220 of one TE can respectively access the frontward RU 110 and the rearward RU 120 through non-contention-based random access. However, when two trains exist between the frontward RU 110 and the rearward RU 120, two TEs need to perform contention-based random access in order to access the RUs 110 and 120.

Figure 2:
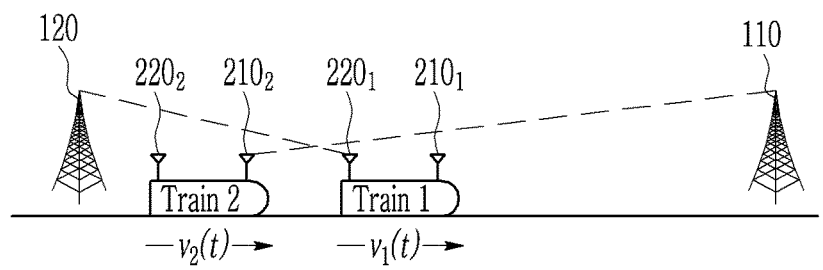
FIG. 2 shows an example in which two trains travel in the same direction in the directional communication network according to the exemplary embodiment of the present invention.

FIG. 2 shows an example of a case in which two trains travel in the same direction in the directional communication network according to the exemplary embodiment of the present invention.

Referring to FIG. 2, a train 1 and a train 2 may exist between the RUs 110 and 120. The train 1 and the train 2 respectively travel from the left to the right with speeds of $v_1(t)$ and $v_2(t)$. The speed $v_1(t)$ and the speed $v_2(t)$ may be equivalent to or different from each other.

The TE of the train 1 is referred to as TE1 and the TE of the train 2 is referred to as TE2. It is assumed that the train 1 enters a duration between the RU 110 and the RU 120 and thus a head antenna $210_1$ and a tail antenna $220_1$ of a TE1 of the train 1 are respectively connected with the forward RU 110 and the rearward RU 120 as shown in FIG. 1. That is, FIG. 1 shows network access states of the head antenna $210_1$ and the tail antenna $220_1$ of the TE1 in a state in which only the train 1 has entered the duration between the RU 110 and the RU 120.

When the train 2 traveling behind enters the duration between the RU 110 and the RU 120, a head antenna $210_2$ of a TE2 first tries to access a network. Since the RU 110 cannot simultaneously serve the train 1 and the train 2 using the same radio resource due to severe interference, the RU 110 simultaneously serves the TE1 of the train 1 and the TE2 of the train 2 by using different radio resources, or may serve only one of the TE1 of the train 1 and the TE2 of the train 2 and ignore an access request of the other one. In this case, such a method that serves only one TE and ignores the other TE may be effective to reduce a random access delay. Thus, in the exemplary embodiment of the present invention, the RU 110 serves only one of the TE1 of the train 1 and the TE2 of the train 2 and ignores an access request of the other TE. In order to use such a method, in the exemplary embodiment of the present invention, network access of a head antenna and a tail antenna of each TE is prioritized.

As shown in Equation 1, it is defined that the head antenna $210_2$ of the TE2 has higher network access priority than the head antenna $210_1$ of the TE1, and the tail antennal $220_2$ of the TE2 has lower network access priority than the tail antenna $220_1$ of the TE1.

$$P_{HeadTE2} > P_{HeadTE1}$$

$$P_{TailTE2} < P_{TailTE1} \quad \text{[Equation 1]}$$

Here, $P_{HeadTE2}$ denotes network access priority of the head antenna $210_2$ of the TE2, and $P_{HeadTE1}$ denotes network access priority of the head antenna $210_1$ of the TE1. $P_{TailTE2}$ denotes network access priority of the tail antenna $220_2$ of the TE2, and $P_{TailTE1}$ denotes network access priority of the tail antenna $220_1$ of the TE1.

In this case, when the train 2 enters the duration between the RU 110 and the RU 120, the head antenna $210_2$ of the TE2 requests a network access. The network access request may include identification information of the TE and an antenna flag that indicates whether an antenna that has requested a network access is a head antenna or a tail antenna. The antenna flag that indicates whether an antenna is a head antenna or a tail antenna may be set to 1 bit. For example, 1 may indicate a head antenna and 0 may indicate a tail antenna, or 0 may indicate a head antenna and 1 may indicate a tail antenna. The network access request may correspond to, for example, a random access preamble of an LTE.

When receiving the network access request, the RU 110 releases a connection with the head antenna $210_1$ of the TE1 and establishes a connection with the head antenna $210_2$ of the TE2 because the network access priority of the head antenna $210_2$ of the TE2 is higher than that of the currently connected head antenna $210_1$ of the TE1.

The head antenna RU $210_1$ of which a connection with the UR 110 is released may try a network re-access request. In this case, the RU 110 rejects the network re-access request from the head antenna $210_1$ of the TE1 until the TE1 or the TE2 passes the the RU 110 and moves out of the current duration. Since the RU 110 is aware of identification information of the TE1, the RU 110 can reject the re-access request from the head antenna $210_1$ of the TE1.

Similarly, the RU2 receives a network access request from the tail antenna $220_2$ of the TE2 while being connected with the tail antenna $220_1$ of the TE1. In this case, since the tail antenna $220_1$ of the TE1 has higher network access priority than the tail antenna $220_2$ of the TE2 according to Equation 1, the RU 120 maintains the connection with the tail antenna $220_1$ of the TE1 and rejects the network access request from the tail antenna $220_2$ of the TE2. The RU 120 rejects the network access request from the tail antenna $220_2$ of the TE2 until the TE1 or the TE2 passes the RU120 and moves out of the current duration.

As described, when two or more TEs enter a service duration of each of the RU 110 and the RU 120, the RU 110 and RU 120 establish a connection with an antenna having a higher network access priority based on predetermined network access priorities of a head antenna and a tail antenna of each TE to thereby avoid RRM and a scheduling process.

Figure 3:
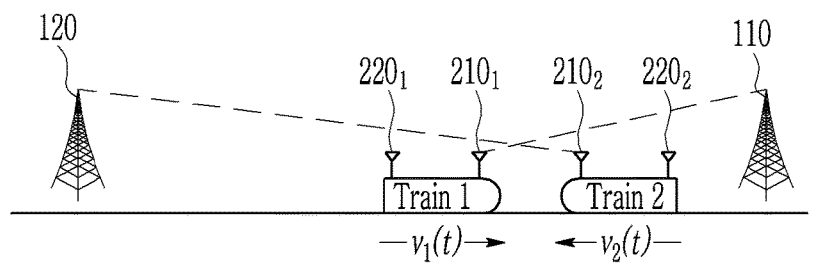
FIG. 3 shows an example of a case in which two trains travel in opposite directions in the directional communication network according to the exemplary embodiment of the present invention.

FIG. 3 shows an example of a case in which two trains travel in opposite directions in the directional communication network according to the exemplary embodiment of the present invention.

Referring to FIG. 3, it is assumed that a train 1 enters a duration between the RU 110 and the RU 120, and a head antenna $210_1$ and a tail antenna $220_1$ of the TE1 are respectively connected to the RU 110 in front and the rear RU 120 as shown in FIG. 1.

When a train 2 enter the duration between the RUs 110 and 120 with speed of speed $[v_2(t)]$ from the right to left direction, a head antenna $210_2$ of the TE2 first tries to access a network.

As shown in Equation 2, it is defined that the head antennas $210_1$ and $210_2$ have higher network access priority than the tail antennas $220_1$ and $220_2$, respectively.

$$P_{Head} > P_{Tail} \quad \text{[Equation 2]}$$

Similar to FIG. 2, when receiving a network access request from the head antenna $210_2$ of the TE2, the RU 120 releases a connection with the tail antenna $220_1$ of the TE1 because the head antenna $210_2$ of the TE2 has higher network access priority than the tail antenna $220_1$ of the TE1, and establishes a new connection with the head antenna $210_2$ of the TE2.

The tail antenna $220_1$ of the TE1 of which the connection with the RU 120 is released may request a network re-access, and the RU 120 rejects the network re-access request from the tail antenna $220_1$ of the TE1 until the TE1 or the TE2 passes the RU 120 and moves out of the current duration. Since the RU 120 is aware of identification information of the TE1, the RU 120 can reject the network re-access request from the tail antenna $220_1$ of the TE1.

Similarly, the RU1 receives the network access request from the tail antenna $220_2$ of the TE2 while being connected with the head antenna $210_1$ of the TE1. Since the head antenna $210_1$ of the TE1 has higher network access priority than the tail antenna $220_2$ of the TE2, the RU 110 maintains the connection with the head antenna $210_1$ of the TE1 and rejects the network access request from the tail antenna $220_2$ of the TE2. The RU 110 rejects the network access request from the tail antenna $220_2$ of the TE2 until the TE1 or the TE2 asses the RU 110 and moves out of the current duration.

As described, when two TEs enter a current service duration of the RUs 110 and 120, one RU (e.g., 110) may be connected with a head antenna or a tail antenna of one TE among the two TEs and the other RU (e.g., 120) may be connected with a tail antenna or a head antenna of the other TE according to predetermined network access priority.

Figure 4:
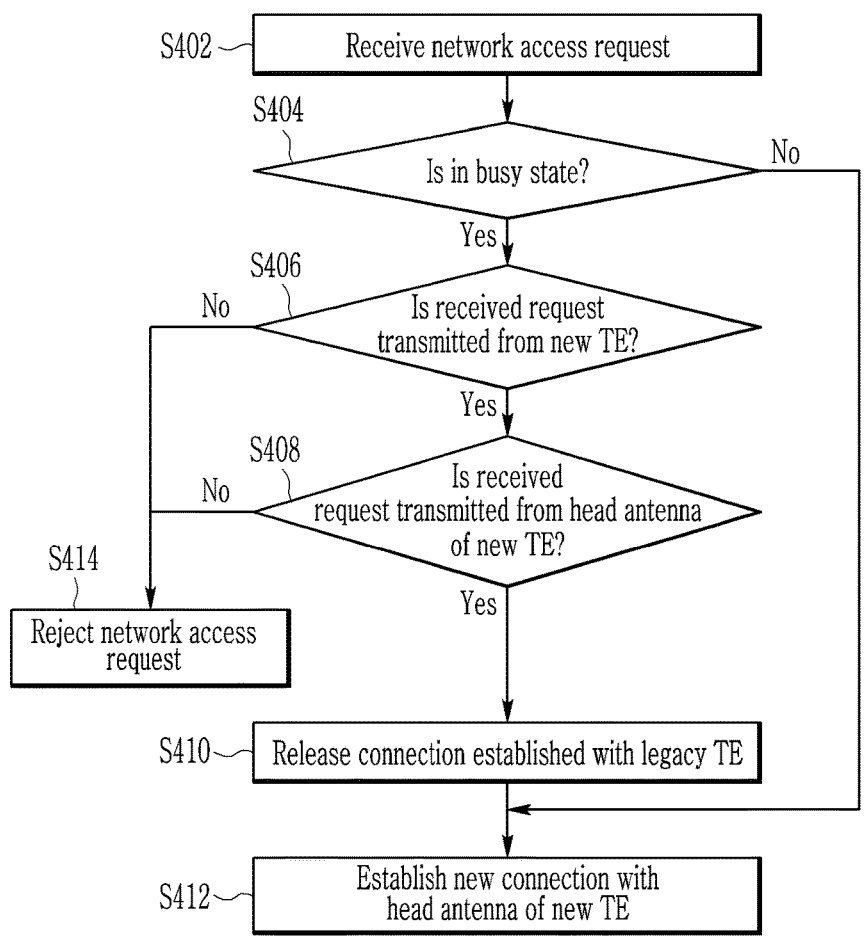
FIG. 4 shows a network access control method of terminal equipment in the directional communication network according to the exemplary embodiment of the present invention.

FIG. 4 shows a method for controlling network access of a TE in the directional communication network according to the exemplary embodiment of the present invention.

A duration between the RU 110 and the RU 120 is referred to as a serving duration, a TE of a train that first enters the serving duration is referred to as a legacy TE, and a TE of a train that enters the serving duration later is referred to as a new TE.

To sum up the situations shown in FIG. 2 and FIG. 3, Equation 1, and Equation 2, a head antenna of the new TE always acquires network access privilege. When a network state of an RU that receives a network access request is in a busy state, a network access request from a tail antenna of the new TE is always rejectd.

If network access priority is defined as given in Equation 3, network access of the TE can be controlled as shown in FIG. 4.

$$P_{HeadNew} > P_{HeadLegacy} > P_{TailLegacy} > P_{TailNew} \quad \text{[Equation 3]}$$

Referring to FIG. 4, when an RU (e.g., 110) receives a new network access request (S402), the RU determines whether a current network access state is a busy state (S404). The busy state implies that the RU 110 is in connection with an antenna of a TE.

If the current network state is the busy state, the RU 110 determines whether the new network access request is transmitted from the new TE (S406).

If it is determined that the new network access request is transmitted from the new TE, the RU 110 determines whether the new network access request is transmitted from a head antenna of the new TE (S408).

If it is determined that the new network access request is transmitted from the head antenna of the new TE, the RU 110 releases an existing connection established with the legacy and establishes a new connection with the head antenna of the new TE (S412).

Meanwhile, if the new network access request is not transmitted from the new TE or is not transmitted from the head antenna of the new TE, the RU 110 rejects the received new network access request (S414).

When the network access state of the RU 110 is not the busy state, the RU 110 sets a new connection with the corresponding antenna of a TE that has transmitted a new network access request.

Meanwhile, the network access priority may be defined as given in Equation 4.

$$P_{HeadNew} < P_{HeadLegacy} < P_{TailLegacy} < P_{TailNew} \quad \text{[Equation 4]}$$

When the network access priority is defined as given in Equation 4, a network access success rate may be decreased compared to the network access priority defined as given Equation 3. For example, when the head antenna $210_2$ of the TE2 tries to access a network in the situation of FIG. 2, the tail antenna $220_2$ of the TE2 continues a connection with a previous RU of the RU 120, and the link between the tail antenna $220_2$ of the TE2 and the previous RU of the RU 120 is activated until the tail antennal $220_2$ of the TE2 enters a new duration. In this case, here is a short time tolerance before the successful network re-access of the head antenna $210_2$ of the TE2. However, when the network access priority is defined as given in Equation 4, this kind of time tolerance cannot be supported.

Meanwhile, three or more trains may cross each other. Although such a situation seldom occurs, spatial division, frequency division, and code division may be performed with respect to the three or more trains so as to avoid co-channel interference.

Figure 5:
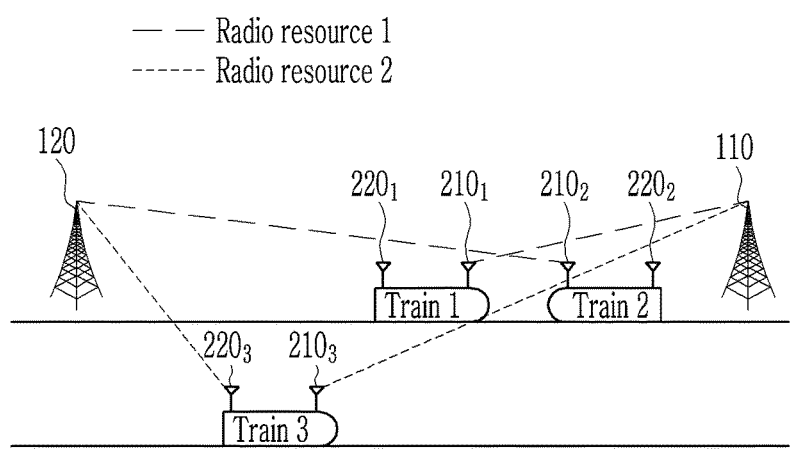
FIG. 5 shows an example of a case in which three trains exist between two radio units in the directional communication network according to the exemplary embodiment of the present invention.

FIG. 5 shows an example in which three trains exist between two RUs in the directional communication network according to the exemplary embodiment of the present invention.

Referring to FIG. 5, when a train 1, a train 2, and a train 3 sequentially enter a duration between the RUs 110 and 120, the RUs 110 and 120 perform the network access control as described with reference to FIG. 3 and FIG. 4 with respect to a TE1 and a TE2, respectively installed in the train 1 and the train 2, and allows a network access request from each of a head antenna $210_3$ and a tail antenna $220_3$ that are installed in a TE3 of the train 3 while using a radio resource that is different from the TE1 and TE2. Here, the radio resource may include at least one of time, a frequency, and a code. For example, the RUs 110 and 120 use a radio resource 1 for the TE1 and the TE2, and use a radio resource 2 for the TE3. In this case, an occupation percentage of a radio resource per each TE may be optimized based on a requirement of quality of service (QoS) and a traffic load balance between TEs.

For example, more specifically, when the TE1 first enters the duration between the RU 110 and the RU 120, the head antenna $210_1$ of the TE1 is connected with the RU 110 and the tail antenna $220_1$ is connected with the RU 120. Next, when the TE2 enters the duration between the RU 110 and the RU 120, the head antenna $210_2$ of the TE2 transmits a network access request to the RU 120. In this case, the head antenna $210_2$ of the TE2 competes with the tail antenna $220_1$ of the TE1 for network access, and accordingly, a network access request of the head antenna $210_2$ of the TE2 succeeds. Meanwhile, the tail antenna $220_2$ of the TE2 transmits a network access request to the RU 110. The tail antenna $220_2$ of the TE2 competes with the head antenna $210_1$ of the TE1, and accordingly, the network access request of the tail antenna $220_2$ of the TE2 fails. Thus, the RU 110 is connected with the head antenna $210_1$ of the TE1 and the RU 120 is connected with the head antenna $201_2$ of the TE2 before the TE3 enters the duration between the RU 110 and the RU 120. When the TE3 enters the duration in such a state, the head antenna $210_3$ of the TE3 transmits a network access request to the RU 110. The RU 110 recognizes that the network access request from the head antenna $210_3$ of the TE3 is a new TE and allocates a new radio resource. That is, the RUs 110 and 120 recognize a TE based on identification information. Before the TE3 enters a corresponding duration, the RU 110 serves the TE1 based on identification information of the TE1 and rejects a request from the TE2 based on identification of the TE2. When the TE3 enters the corresponding duration, the RU 110 can determine the identification information of the TE3 from the network access request from the head antenna $210_3$ of the TE3, and becomes aware of an existence of the TE3 in the corresponding duration based on a difference between the identification information of the TE3 with those of the TE1 and the TE2. In this case, the RU 110 allocates a new radio resource for the head antenna 210₃ of the TE3.

Similarly, when receiving a network access request from the tail antenna 220₃ of the TE3, the RU 120 allocates a new radio resource.

Meanwhile, when the train 1 and the train 2 exit the duration between the RU1 and the RU 120 before the third train 3 enters the duration, the network access control described with reference to FIG. 2 and FIG. 3 is performed.

Similarly, when a train 1, a train 2, a train 3, and a train 4 sequentially enter the duration between the RU 110 and the RU 120, the RU 110 and the RU 120 perform the network access control with respect to a pair of TE1 and TE2, respectively installed in the train 1 and the train 2 as described above with reference to FIG. 3 and FIG. 4, and the network access control is performed with respect to a pair of TE3 and TE4, respectively installed in the train 3 and the train 4 as described above with reference to FIG. 3 and FIG. 4. Next, the RU 110 and the RU 120 may use different radio resources with respect to the pair of TE 1 and TE2 and the pair of TE3 and TE4.

Figure 6:
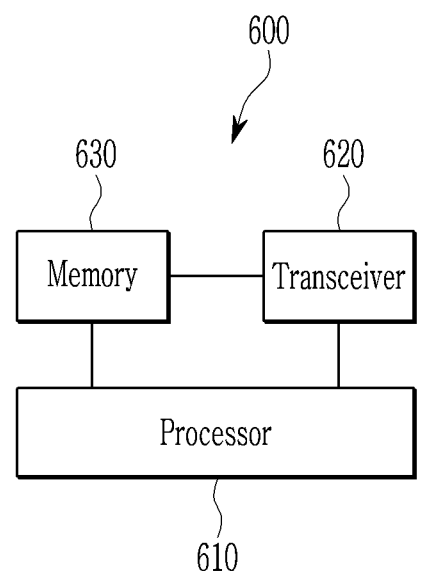
FIG. 6 shows a network access control apparatus according to an exemplary embodiment of the present invention.

As described, when three or more TEs exist in the duration between the RU 110 and the RU 120, RRM and a scheduling process cannot be avoided in the duration between the RUs 110 and 120, but three or more TEs rarely exist in the duration between the RUs 110 and 120 and a connection of a TE can be more prioritized than a random access delay even when three or more TEs exist in the duration between the RUs 110 and 120. FIG. 6 shows a network access control apparatus according to an exemplary embodiment of the present invention.

Referring to FIG. 6, a network access control apparatus 600 includes at least one processor 610, a transceiver 620, and a memory 630. The network access control apparatus 600 may be implemented in a DU of a base station.

The at least one processor 610 may be implemented as a central processing unit (CPU), another chip set, or a microprocessor.

The transceiver 620 is connected with the processor 610 and transmits/receives a wireless signal to/from a TE in a moving object.

The memory 630 is connected with the processor 610 and stores various kinds of information for driving the processor 610. The memory 630 stores commands that are going to be performed by the processor 610, or loads commands from a storage device (not shown) and temporarily stores the loaded commands. The memory 630 may include a read-only memory (ROM), a random access memory (RAM), a flash memory, a memory card, a storage medium and/or another storing device.

As previously described with reference to FIG. 2 to FIG. 5, when two or more TEs exist in a serving duration of an RU, the processor 610 controls a network access according to network access priority of a head antenna and network access priority of a tail antenna of each TE. In addition, when a connection is established with two or more TEs as shown in FIG. 5, the processor 610 uses different radio resources for the connected TEs so as to avoid co-channel interference. When two or more TEs exist in the serving duration of the RU, the processor 610 loads a program command for controlling a network access according to network access priority of the head antenna and the tail antenna of each TE for performing the network access controls as described above with reference to FIG. 2 to FIG. 5. In addition, such a program command may be stored in the memory 630, or may be stored in another system connected through a network.

According to the exemplary embodiment of the present invention, RRM and scheduling can be avoided when two moving objects cross the same serving duration between two RUs such that a load of a digital unit of a base station that processes RRM and scheduling can be reduced and a network random access delay can be decreased. Further, compared to an existing random access process, the random access process can be more simplified.

The network random access method according to the exemplary embodiment of the present invention can be applied to an existing mobile communication system such as an LTE and 3GPP new radio (NR).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A network access control method for controlling network access of terminal equipment (TE) in a moving object by at least one processor of at least one radio unit (RU), the network access control method comprising:

defining a network access priority of each of two antennas of each of a first TE and a second TE located on different moving objects so that a first RU among two RUs is connected with one antenna of the two antennas of the first TE and a second RU among the two RUs is connected with one antenna of the two antennas of the second TE, when the first TE and the second TE enter a serving duration between the first RU and the second RU;

establishing a connection between the first RU and a first antenna among the two antennas of the first TE and a connection between the second RU and a second antenna among the two antennas of the first TE, according to the network access priority of the two antennas of the first TE when the first TE first enters the serving duration;

establishing a new connection between one RU among the two RUs and a first antenna among the two antennas of the second TE, according to the network access priority of the two antennas of the first TE and the second TE when the second TE next enters the serving duration; and refusing a connection between the other RU among the two RUs and the second antenna among the two antennas of the second TE, according to the network access priority of the two antennas of the first TE and second TE.

2. The network access control method of claim 1, wherein:

the establishing of the new connection between one RU and the first antenna of the second TE comprises:

releasing the connection between the first RU and the first antenna of the first TE; and establishing the new connection between the first RU and the first antenna of the second TE, the refusing of the connection between the other RU and the second antenna of the second TE comprises:

maintaining the connection between the second RU and a second antenna of the first TE; and refusing the connection between the second RU and the second antenna of the second TE, wherein the network access priority of the of first antenna of the second TE is higher than the network access priority of the first antenna of the first TE, the network access priority of the of second antenna of the second TE is lower than the network access priority of the second antenna of the first TE.

3. A network access control method for a radio unit (RU) that controls network access of terminal equipment (TE) in a moving object, comprising:
 establishing a connection with a first antenna among two antennas of a first TE in a first moving object that first enters a serving duration of the RU according to a network access request from the first antenna;
 receiving a network access request from a second antenna among two antennas of a second TE in a second moving object that next enters the serving duration; and
 processing the network access request from the second antenna based on network access priority of the second antenna and network access priority of the first antenna to which the connection is established,
 wherein the processing of the network access request comprises:
 releasing the connection with the first antenna when the network access priority of the second antenna is higher than that of the first antenna;
 establishing a new connection with the second antenna; and
 when receiving a network re-access request from the first antenna of which the connection is released, refusing the network re-access request until the first TE or the second TE exits the serving duration.

4. The network access control method of claim 2, wherein the refusing of the connection between the other RU and the second antenna of the second TE further comprises refusing the connection between the second RU and the second antenna of the second TE until the first TE or the second TE exits the serving duration.

5. The network access control method of claim 1,
 wherein the establishing of the new connection between one RU and the first antenna of a second TE comprise receiving a network access request from a first antenna of the second TE, and
 wherein the network access request comprises identification information of the second TE and an antenna flag that indicates whether the first antenna that has sent the network access request is a head antenna that is disposed in front or a tail antenna that is disposed behind with reference to a moving direction of the moving object.

6. The network access control method of claim 5, wherein the network access priority of the head antenna is set to be higher than the network access priority of the tail antenna, the access priority of the head antenna of the second TE is set to be higher than the access priority of the head antenna of the first TE, the access priority of the tail antenna of the second TE is set to be lower than the access priority of the head antenna of the first TE, and the first antenna is the head antenna.

7. The network access control method of claim 5, wherein when network access priority of the head antenna is set to be lower than the network access priority of the tail antenna, the access priority of the head antenna of the second TE is set to be lower than the access priority of the head antenna of the first TE, the access priority of the tail antenna of the second TE is set to be higher than the access priority of the head antenna of the first TE, and the first antenna is the tail antenna.

8. The network access control method of claim 1, further comprising:

establishing a connection between the first RU and a first antenna among two antennas of a third TE located on a third moving object and a connection between the second RU and a second antenna among the two antennas of the third TE, according to the network access priority of the two antennas of the third, when the third TE enters the serving duration after the second TE; and
 communicating with the third TE using a radio resource that is different from radio resources allocated for the first TE and the second TE.

9. A network access control apparatus of a radio unit (RU) in a directional communication network, comprising:
 a transceiver that communicates with one antenna among two antennas of each terminal equipment (TE) located on moving objects that enter a serving duration of the RU; and
 a processor that establishes a connection with one antenna among two antennas of one TE, according to network access priority of the two antennas of each TE,
 wherein when a first TE and a second TE located on different moving objects enter a serving duration between a first RU and a second RU, the network access priority of each of two antennas of each of the first TE and the second TE is defined so that the first RU is connected with one antenna of the two antennas of the first TE and the second RU is connected with one antenna of the two antennas of the second TE,
 wherein when the first TE first enters the serving duration, a connection between the first RU and a first antenna among the two antennas of the first TE and a connection between the second RU and a second antenna among the two antennas of the first TE are established according to the network access priority of the two antennas of the first TE;
 wherein when the second TE next enters the serving duration, a new connection between one RU among the two RUs and a first antenna among the two antennas of the second TE is established according to the network access priority of the two antennas of the first TE and the second TE; and
 wherein a connection between the other RU among the two RUs and a second antenna among the two antennas of the second TE is refused according to the network access priority of the two antennas of the first TE and second TE.

10. The network access control apparatus of the RU of claim 9, wherein, when the network access priority of a first antenna of the second TE is set to be higher than that of a first antenna of the first TE, and the network access priority of a second antenna of the second TE is set to be lower than that of a second antenna of the first TE.

11. The network access control apparatus of the RU of claim 10, wherein, when the first TE first enters the serving duration and then the second TE enters the serving duration, the processor of the first RU releases a connection established with the first antenna of the first TE and establishes a new connection with the first antenna of the second TE, and the processor of the second RU maintains a connection established with the second antenna of the first TE and refuses a connection with the second antenna of the second TE.

12. The network access control apparatus of the RU of claim 10, wherein each processor of the first RU and the second RU receive a network access request of corresponding antenna of the first TE and the second TE, the network access request comprises identification information of the corresponding TE and an antenna flag that indicates whether the corresponding antenna that has sent the network access request is a head antenna that is disposed in front or a tail antenna that is disposed behind with reference to a moving direction of the moving object.

13. The network access control apparatus of the RU of claim 12, wherein network access priority of a head antenna is set to be higher than network access priority of a tail antenna, the first antenna is the head antenna, and the second antenna is the tail antenna.

14. The network access control apparatus of the RU of claim 13, wherein the network access priority of a head antenna is set to be lower than network access priority of a tail antenna, the first antenna is the tail antenna, and the second antenna is the head antenna.

15. The network access control apparatus of the RU of claim 11, wherein when a third TE located on a third moving object enters the serving duration after the second TE, the processor of the first RU establishes a connection with one antenna among two antennas of the third TE, and the processor of the second RU establishes a connection with the other antenna among the two antennas of the third TE, and the processors of the first RU and the second RU communicate with corresponding antenna of the third TE using a radio resource that is different from radio resources allocated for the first TE and the second TE.

* * * * *